United States Patent [19]
Ferla et al.

[11] Patent Number: 5,159,352
[45] Date of Patent: Oct. 27, 1992

[54] DYNAMIC FOCUSING SYSTEM FOR USE WITH DISCONTINUOUS MEDIUM

[75] Inventors: Guillermo S. Ferla, Reading; Walter P. Haimberger, Topsfield; Robert F. Hartmann, West Bridgewater, all of Mass.

[73] Assignee: Polaroid Corporation, Cambridge, Mass.

[21] Appl. No.: 821,177

[22] Filed: Jan. 15, 1992

Related U.S. Application Data

[63] Continuation-in-part of Ser. No. 617,024, Nov. 21, 1990, abandoned.

[51] Int. Cl.⁵ ............................................. G01D 9/42
[52] U.S. Cl. ................................................. 346/108
[58] Field of Search ........................ 346/108; 358/296

[56] References Cited

U.S. PATENT DOCUMENTS

| | | |
|---|---|---|
| 3,493,764 | 2/1970 | Craig et al. |
| 4,435,055 | 3/1984 | Berdat et al. ............... 346/108 X |
| 4,492,970 | 1/1985 | Lee et al. ..................... 346/108 X |
| 4,581,617 | 4/1986 | Yoshimoto et al. ............ 346/108 |
| 4,707,710 | 11/1987 | Shinada ........................ 346/108 |
| 4,712,118 | 12/1987 | Seto et al. ..................... 346/108 |
| 4,727,381 | 2/1988 | Bille et al. ..................... 346/108 |
| 4,762,985 | 8/1988 | Imai et al. ..................... 250/201.4 |
| 4,775,967 | 10/1988 | Shimada et al. ............... 369/44.26 |
| 4,815,058 | 3/1989 | Nakamura et al. ............. 369/44.23 |
| 4,826,268 | 5/1989 | Kramer ......................... 346/108 X |
| 4,881,086 | 11/1989 | Misawa ......................... 346/108 |
| 4,901,089 | 2/1990 | Bricot ........................... 346/108 X |
| 4,908,634 | 3/1990 | Arimoto et al. ............... 346/108 |
| 4,933,687 | 6/1990 | Winsor ......................... 346/108 |
| 4,949,100 | 8/1990 | Hidaka ......................... 346/108 |

Primary Examiner—A. T. Grimley
Assistant Examiner—William J. Royer
Attorney, Agent, or Firm—Francis J. Caufield

[57] ABSTRACT

A printing system employs a rotating drum for carrying a photosensitive printing medium in the form of a discontinuous sheet, there being a clamp carried by the drum and rotating therewith for holding ends of the sheet to secure the sheet to the drum. The system includes a print head having a laser beam which is spatially and temporally modulated for gray-scale printing of individual pixels of an image. The head is scanned parallel to an axis of the drum. A servomechanism responsive to angular orientation of the drum produces a linear scan during rotation of the drum. An optical system within the head provides a common path through a common objective lens for both a write laser beam and for a focus laser beam of an automatic focusing apparatus which positions the objective lens rapidly by a dither motion to compensate for undulations in the surface of the print medium. The objective lens is carried at a reference position during passage of the clamp, the reference position being updated periodically by measurements of focus.

19 Claims, 5 Drawing Sheets

DYNAMIC FOCUSING SYSTEM FOR USE WITH DISCONTINUOUS MEDIUM

CROSS REFERENCE TO RELATED APPLICATION

This application is a continuation-in-part of U.S. patent application Ser. No. 07/617,024, filed on Nov. 21, 1990, now abandoned.

BACKGROUND OF THE INVENTION

This invention relates to the focusing of an optical print head upon a discontinuous print medium secured to a print drum by a clamp and, more particularly, to the use of coaxially disposed focusing and write laser beams to enable close positioning of an objective lens to the print medium during writing, and including lens-positioning apparatus for locating the lens at a reference position for passage over the clamp during rotation of the drum.

Optical printers employing a photosensitive recording medium and a laser beam for writing alphanumeric and pictorial data on the recording medium are in wide use today, these printers including laser printers for outputting hard copy from computers and facsimile machines. The printers employ various optical systems for focusing and directing a laser beam upon the recording medium. The printers employ various transports for moving the recording medium past a print station for illumination by the laser beam, and various electro-optical devices for controlling the intensity of the laser beam and for modulating the laser beam. It is of particular interest to increase the speed of the writing, and also to increase the resolution of an image produced on the print medium so as to provide a higher output printing rate and improved image quality.

While various forms of photosensitive materials may be employed four the print medium, it is advantageous to employ a photosensitive material having a binary characteristic in terms of its response to incident radiation such that, below a threshold intensity of incident radiation, there is no imprinting of marks on the material. For radiation incident upon the material with an intensity above the threshold, marks are imprinted upon the material. The binary characteristic may include also a frequency response in that, by way of example, a minimum threshold value of frequency is required to activate the photosensitive material and that, for radiation of a lower frequency, there is no imprinting of marks. Such a binary characteristic enhances the production of half-tone images formed by an array of loosely spaced dots, as well as gray-scale images wherein the density of dots is varied within each pixel to produce a gray scale.

A problem arises in that there is a need for higher resolution images than is available with present printing systems. Also, it is desirable to include numerous shades of gray by the distribution of dots of varying density within the pixels of the image. However, currently available printers are limited in their capacity for performing high-resolution gray-scale images, and are also limited in the speed at which such images can be produced.

SUMMARY OF THE INVENTION

The aforementioned problem is overcome and other advantages are provided by an optical printing system employing a beam of radiation incident upon a photosensitive recording, or print medium wherein, in accordance with the invention, the incident radiation is focused as a write beam by an objective lens which is placed close to the print medium for illuminating the medium with a field of light present directly in front of a radiation source comprising an array of laser diodes for optimizing uniformity of illumination. Such a positioning of the medium relative to the lens provides for a distribution of radiation intensity which differs from that in the far fields or Fraunhofer region. Of particular interest in the practice of the invention is the fact that the distribution of the radiation intensity in the near field is more uniform then in the far field. This is of particular importance in the case of finer-grain pixels which are, themselves, created by a distribution of minute dots, possibly of various shapes, so as to provide greater control and fidelity in the creation of these dots. Thereby, the optical system of the invention enables the production of an accurate multiple-level gray scale to images produced by the system of the invention.

The invention provides for a high speed of scanning by employing a print drum carrying a sheet of photosensitive material, the print medium, secured to an outer surface of the drum by a clamp extending parallel to a rotational axis of the drum. A print head contains a laser which serves as the source of the radiation of the write beam, and an optical system including the foregoing objective lens for collimating rays of the radiation and for focusing the radiation upon the print medium. The print head advances along the drum in a direction parallel to the rotational axis as the drum rotates. The concurrent translation of the print head and rotation of the drum produces a spiral path of travel of the objective lens along the surface of the print medium. The spiral path allows the printing to be accomplished with increased rapidity.

The close spacing of the objective lens to the print medium enables printing with a resolution of better than 250 pixels per inch. To produce a gray scale within each pixel, smaller dots, or rectangular spots, of 3 by 30 micrometers or 3 by 5 micrometers may be employed, by way of example. The invention employs a telecentric optical system for guiding laser radiation to the print medium, with a lens positioning system capable of a positional accuracy within 5-10 microns to maintain desired spot size and uniformity of illumination throughout each pixel.

In accordance with the invention, the objective lens is positioned within a housing of the print head by means of an electric coil and magnet assembly, analogous to a speaker coil, wherein electrical excitation of the coil produces a small displacement of the objective lens relative to the housing. By varying the amplitude and sense of the excitation current, the lens can be moved forward towards the print medium or retracted from the print medium by small increments in position as are required to track slight changes in distance which may occur between the print medium and the objective lens during rotation of the drum.

A further optical system including focusing apparatus is responsive to the distance between the lens and the medium for producing a signal which drives the lens-positioning coil. However, the signal of the focusing apparatus is disabled during passage of the clamp at the print head. A memory stores an updated value of reference position for the objective lens to ready the lens for resumption of printing subsequent to passage of the clamp, the updating being in accordance with signals of a shaft-angle encoder outputting the angular position of the drum. Another optical system sights the position of the objective lens relative to the housing, and activates the coil to place the objective lens at the reference position during passage of the clamp.

A feature of the invention is the use of the objective lens for projecting both the write beam concurrently with a projection of a further laser beam which serves as a focus beam for use with the focusing apparatus. The focus beam has radiation characteristics of intensity which do not excite the print medium to produce a mark, this being in contradistinction to the write beam which has radiation characteristics of frequency and intensity which do excite the print medium to produce a mark. While most of the incident radiation is absorbed by the print medium, there is some reflection, approximately 4% of the incident power. Accordingly, the reflected radiation includes radiations of both the write and the focus beams.

In order to separate reflections of the write beam from reflections of the focus beam to allow operation of the focusing apparatus without interference from the write beam, the optical system includes dichroic prisms mounted with optical coatings therebetween to provide for reflections and transmissions of radiation based on polarization of the electric vector. A quarter-wave plate is employed to reverse the direction of polarization of a reflected wave from that of an incident wave. This enables the waves of radiation outputted by the write laser and a focus laser to be directed by the prisms on a path which leads to the medium and away from a detector assembly of the focusing apparatus. During propagation along the return path from the print medium, the prisms function with the altered polarization to direct the reflected light toward the detector assembly. A color filter blocks passage of the write beam, while permitting passage of the focus beam to the detector. The radiations of the two beams are separated in frequency such that their wavelength differ by approximately 40 angstroms, this being sufficient to allow for separation by the color filter.

The resulting configuration of the print head allows for rapid positioning of both the head and the objective lens to accommodate a rapid scanning of the print medium in conjunction with rotation of the print drum. Also, accurate focus of the objective lens is maintained with the print medium located within the near field of the objective lens. This provides the printing system of the invention with the requisite speed and resolution desired for high-quality gray-scale imaging.

BRIEF DESCRIPTION OF THE DRAWING

The aforementioned aspects and other features of the invention are explained in the following description, taken in connection with the accompanying drawing wherein.

DETAILED DESCRIPTION

Figure 1:
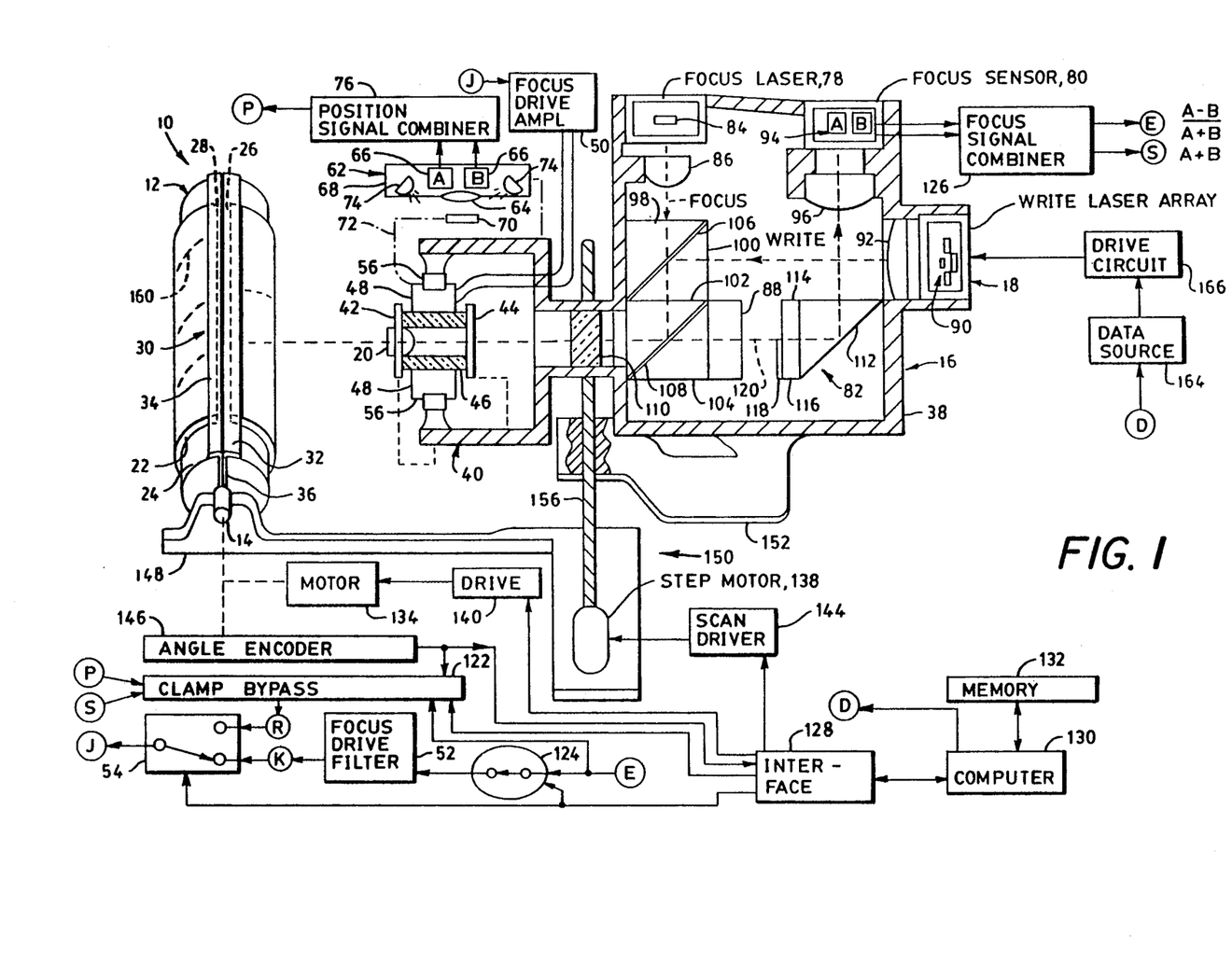
FIG. 1 shows a printing system incorporating the invention, portions of the system being shown in sectional view, and portions being shown diagrammatically.

In FIG. 1, a printing system 10 includes a circular cylindrical drum 12 rotatable about a shaft 14 disposed along an axis of the cylindrical drum, and a print head 16 including a source 18 of radiation focused by an objective lens 20 upon a sheet 22 of photosensitive material carried by the drum 12. The sheet 22 is wrapped about an outer cylindrical surface 24 of the drum 12 with opposed ends 26 and 28 of the sheet 22 being pressed against the drum surface 24 by a clamp 30.

While the clamp 30 may have various configurations, one such configuration which is readily implemented includes a pair of opposed wings 32 and 34 which extend perpendicularly from a stem 36 to envelop the sheet ends 26 and 28, respectively. The stem 36 is disposed parallel to the axis of the drum 12, and extends inwardly from the drum surface 24 towards the shaft 14 so as to be secured to the drum 12 during rotation of the drum 12. The clamp wings 32 and 34 are resilient so as to exert a spring force upon the sheet ends 26 and 28, and thereby secure the sheet 22 to the drum 12.

In accordance with a feature of the invention, the print head 16 includes a housing 38 which supports the radiation source 18. A portion of the housing 38 is cantilevered in the form of a carriage 40 which supports the objective lens 20 via a pair of spring legs 42 and 44, the legs 42 and 44 connecting between the carriage 40 and a frame 46 which holds the lens 20. In order to view components which are hidden in the view of FIG. 1, some of the components in the carriage 40 are shown displaced, similar to an exploded view so that all functions of the carriage can be understood from the figure. The components of the carriage 40 are shown in their true positions, but in stylized form, in FIG. 7. The housing 38, the carriage 40, and the legs 42 and 44 may be constructed of a metal such as aluminum. The frame 46 has a circular cylindrical form, and is constructed of a relatively light-weight material such as fibrous glass embedded in a bonding agent. The frame 46 carries the lens 20 at a forward end thereof, near the drum 12, with the opposed sides of the frame 46 being used to support coils 48 of electric wire, the coils 48 having a construction similar to that of a voice coil employed in the well-known construction of loud speakers. The total mass of the frame 46 with the lens 20 and the coils 48 is sufficiently small so as to permit rapid displacement of the lens 20 along a cylindrical axis of the frame 46, in the manner of a dither movement for precise focusing of radiation of the source 18 upon the moving sheet 22. In accordance with the invention, any small perturbations on the outer surface of the sheet 22, such as a perturbation due to a variation of thickness of the sheet 22, is compensated for by a rapid retraction of the lens 20 from the sheet 22 or a rapid advancement of the lens 20 towards the sheet 22 so as to maintain radiation of the source 18 focused upon the sheet 22.

The coils 48 are activated electrically with current provided by a focus drive amplifier 50, the amplifier 50 being part of a feedback loop including a filter 52, such as a lead-lag filter, for loop stability. Further components of the loop will be described hereinafter. Electric signals for the amplifier 50 are coupled from a switch 54 by terminal J and the filter 52 during a focussing of the lens 20. The housing 38 also supports permanent magnets 56 adjacent the coils 48, the magnets 56 lying alongside the frame 46 for interacting magnetically with the coils 48 upon energization of the coils 48 with electric current. Activation of the coils 48 with current produces a magnetic force relative to the magnet 56, the force displacing the coil 48 with the frame 46 and the lens 20 along a common axis of the frame 46, the coil 48 and the lens 20 for retracting or advancing the lens 20 relative to the drum 12. The magnitude and direction of the force depends in well-known fashion upon the magnitude and direction of the current in the coil 48.

As will be described hereinafter, it is useful in the practice of the invention to provide a reference position on the lens-carrying frame 46 relative to the housing 38. For this purpose, lens-location detection apparatus 62 is carried by carriage 40 of the housing 38 alongside the frame 46 for detecting the location of the lens 20 relative to the housing 38. The apparatus 62 includes a lens 64 and a pair of photodetectors 66 supported by an extension 68 of the carriage 40. The detection apparatus 62 further comprises a target 70 mounted on a bottom 72 (indicated diagrammatically in FIG. 1, but shown in FIG. 7) of the frame 46, and a pair of LED's 74 held by the carriage extension 68 for illuminating the target 70. By way of example in the construction of the detection apparatus 62, interior portions of the extension 68 and the bottom 72 may be provided by with a nonreflecting black color, while the target 70 may be provided with a reflective white color.

The operation of the detection apparatus 62 in outputting a signal dependent on the location of the target image is well known. The photodetectors 66 are located one behind the other for viewing successive positions of the target 70. The amount of light received by each of the photodetectors 66 varies with the position of the target 70. Each of the photodetectors 66 outputs an electrical signal to a signal combiner 76 in response to light impinging upon the photodetectors 66, the light being provided by the lamps 74 and reflected by the target 70 through the lens 64 to the photodetectors 66. The signal combiner 76 outputs a signal at terminal P equal to the difference between two signals outputted by respective ones of the photodetectors 66. The photodetectors 66 may be identified further by the legends A and B in which case the difference signal is given by A−B. The normalized difference signal is outputted at terminal P, this being given by the difference signal A−B divided by the sum of the detector signals A+B. The two signals of the photodetectors 66 are of equal amplitude when the image of the target 70 is positioned equally distant between the two photodetectors 66. Displacement of the image of the target 70 closer to one or the other of the two photodetectors 66 results in a nonzero signal outputted at terminal P to the switch 54 via a clamp bypass circuit (to be described hereinafter). The sense of the signal at the terminal P depends on which of the photodetectors 66 is closet to the target image, the amplitude of the signal at the terminal P depending on the difference in spacing between the target 70 and the photodetectors 66.

In accordance with an important feature of the invention, the printing system 10 further comprises a focus laser 78 and a focus sensor 80 coupled via an optical system 82 to the objective lens 20. The laser 78, the sensor 80, and the optical system 82 are mounted within the housing 38. The optical system 82 also serves to couple radiation from the source 18 to the objective lens 20. Thus, a portion of the optical system 82 provides a common path for radiation of both the source 18 and the focus laser 78. The focus laser 78 may employ radiation in a part of the electromagnetic spectrum which is readily focused, the radiation employed in a preferred embodiment of the invention being in the near infrared region of the spectrum, and being provided by a laser diode (LD) 84. The focus laser 78 further comprises a lens 86 for collimating rays of radiation emitted by the diode 84 to provide a focus beam. Radiation emitted by the diode 84 is linearly polarized.

Similarly, radiation provided by the source 18, in the preferred embodiment of the invention, is also in the near infrared region, but differing in frequency from the frequency of the focus radiation of the LED 84 so as to permit separation of the two radiations by a color sensitive filter, or interference filter, 88, as will be described hereinafter. The radiation source 18, in a preferred embodiment of the invention, comprises a plurality of light-emitting laser diodes (LD's) located at 90, the diodes 90 emitting linearly polarized radiation, and being disposed in an array for producing a plurality of gray-scale levels of darkness to each pixel imprinted upon the photosensitive sheet 22. Also included within the radiation source 18 is an optical system shown schematically by lens 92 for collimating rays of radiation emitted by the diodes 90 to produce a beam of radiation, this being the write beam, which propagates through the optical system 82 and the objective lens 20 to impinge upon the sheet 22.

The focus sensor 80 comprises an array of two photodetectors indicated generally at 94, and a lens 96 for focusing radiation of the focus beam upon the photodetectors 94. It is noted that light received at the photodetectors 94 emanates at the focus laser 78, is directed by the optical system 82 to the photosensitive sheet 22 from which the radiation is reflected, and is redirected by the optical system 82 to the focus sensor 80.

The optical system 82 comprises four dichroic prisms 98, 100, 102, and 104 which are arranged serially along a path of propagation of the focus beam. An optical coating 106 lies along an interface between the prisms 98 and 100. An optical coating 108 lies along an interface between the prisms 102 and 104.

The optical system 82 further comprises a quarter-wave plate 110 disposed between the prism 102 and the frame 46, a corner-reflecting prism 112, and a knife edge optical element 114 comprising a transparent plate 116 supporting an opaque layer 118 extending halfway across collimated rays 120 of the reflected focus beam. The plate 116 is contiguous to a face of the prism 112.

In operation, elements of the optical system 82 are held in their respective positions by a housing 38. Polarization of the focus radiation is parallel to polarization of the write radiation within the prism 100. Radiation of the write beam is reflected perpendicularly by the prism 100, and undergoes a second perpendicular reflection by the prism 102 to pass through the quarter-wave plate 110 and the objective lens 20 to impinge upon the photosensitive sheet 22. Most of the radiation of the write beam is absorbed within the material of the sheet 22, but a small fraction, approximately 4% by way of example, reflects back through the lens 20, the plate 110, the prism 102, and the prism 104, and is finally stopped by the filter 88, the latter lying contiguous a face of the prism 104. Radiation of the focus beam passes along a straight path through the prisms 98, 100, and 102, and is reflected perpendicularly by the prism 102 to pass through the plate 110 and the lens 20 to reflect off of the photosensitive sheet 22. Reflected radiation of the focus beam passes along a straight path through the lens 20, through the plate 110, through the prisms 102 and 104, through the filter 88, through the knife-edge element 114, and into the prism 112. The prism 112 reflects the focus beam perpendicularly along a path which carries the focus radiation into the focus sensor 80.

It is noted that the quarter-wave plate 110 converts the plane polarized light from both the focus laser 78 and the radiation source 18 to circularly polarized radiation. Upon reflection from the photosensitive sheet 22, the circularly polarized reflected radiation interacts further with the quarter-wave plate 110 to produce linearly polarized radiation which is perpendicular to the radiation incident upon the plate 110 from the prism 102. As a result of the reorientation of the plane of polarization of the reflected radiation relative to the incident radiation by the plate 110, reflected radiation propagates along a linear path through the interface of the prisms 102 and 104. This is in contradistinction to the perpendicular reflection undergone by the incident beam of light at the interface between the prisms 102 and 104.

Assuming that all of the reflected radiation of the write beam has been stopped by the filter 88, only the radiation of the focus beam interacts with the knife-edge element 114. The knife-edge element 114 interacts with the radiation of the reflected focus beam in a manner dependent upon the degree of focus of incident radiation of the focus beam by the objective lens 20 upon the photosensitive sheet 22. As a result of the interaction of the knife-edge element 114 with the radiation of the reflected focus beam, which relationship is well-known, the distribution of radiation incident upon the array of photodetectors 94 of the sensor 80 varies in a well-known fashion in accordance with the degree of focus of the incident focus beam upon the photosensitive sheet 22. With correct focus, both of the photodetectors 94 output equal signals in response to the radiation incident upon the photodetectors 94.

The radiations produced by the focus laser 78 and the source 18 are sufficiently close in frequency such that the presence of a focus by the focus beam indicates adequate focus by the write beam. It is noted that, in the case of a print medium formed of a laminated structure of an outer transparent film which allows transmission of radiation of the write laser to impinge upon an inner layer, wherein the outer film is reflective of radiation of the focus laser, then radiations of the two lasers are reflected from slightly different locations, namely, the outer film and the inner layer. This can be compensated by optically offsetting the focus beam relative to the write laser beam.

Upon a correct focusing of the print head 16, all of the photodetectors 94 of the sensor 80 output equal signals. However, upon a shift of the focus such that the objective lens 20 is either too close or too far from the photosensitive sheet 22, the signals outputted by the photodetectors 94 differ from each other. The output signals of the photodetectors 94 are connected to a two-channel signal combiner 126 which forms sums and differences of the photodetector signals to output at terminal E a signal representing focus error of the print head 16. The signal at terminal E is applied, via the filter 52, to the switch 54, and to the clamp bypass circuit as will be described in further detail hereinafter. The photodetectors 94 may be identified further by the legends A and B in which case the difference signal is given by $A - B$. The normalized difference signal is outputted at terminal E, this being given by the difference signal $A - B$ divided by the sum of the detector signals $A + B$. The sum signal $A + B$ is outputted at terminal S.

The printing system 10 includes the clamp bypass circuit 122 connected between terminals E and P, a switch 124 connected between terminal E and the focus drive filter 52, and an interface 128 for coupling of signals with a computer 130 and a memory 132. The computer 130 is coupled to both the interface 128 and the memory 132. Also included in the system 10 are two stepping motors 134 and 138, two drivers 140 and 144 having circuitry for energizing, respectively, the motors 134 and 138, and a shaft-angle encoder 146. The motor 134 rotates the drum shaft 14, the latter being rotatably mounted in a frame 148. The encoder 146 connects with the shaft 14 for outputting the angular orientation of the drum 12 to the computer 130 via the interface 128. Upon activation of the printing system 10 by an operator inputting a start command to the computer 130 in a manner to be described, the computer 130 signals the driver 140, via the interface 128, to activate the motor 134 to rotate the drum 12. By virtue of the feedback of drum orientation via the encoder 146 to the computer 130, operation of the computer 130, and of the entire system 10, can be synchronized with rotation of the drum 12.

The print head 16 is movable in a parallel path relative to the axis of the drum 12 by a servo system 150. The servo system 150 connects the housing 38 of the print head 16 with the frame 148 which holds the print drum 12. The servo system 150 includes a rigid member 152 which is connected by a lead screw 156 to the frame 148. The lead screw 156 is powered by the motor 138. During operation of the printing system 10, the motor 138 is activated by the driver 144 in response to signals of the computer 130 coupled via the interface 128 to the driver 144.

Operation of the lead screw 156 translates the member 152 and the print head 16 in a direction parallel to the axis of the drum 12 during rotation of the drum 12 to effect a spiral scan of the photosensitive sheet 22, the spiral scanning path being indicated by a dashed line at 160.

Relatively small displacements of the lens 20 as may be necessary to maintain focus on small undulations in the surface of the sheet 22, is accomplished by electrical activation of the coils 48. Activation of the coil 48 is accomplished in synchronism with rotation of the drum 12 by virtue of drum orientation angle data provided by the encoder 146 to the computer 130. Use of the computer 130 to direct activation of the rapidly responding coil 48, as well as activation of the switch 54, is accomplished with the aid of the computer 130 by the interface 128 as will be described hereinafter with reference to FIG. 2.

The feedback loop employing the coil 48 for focussing the objective lens 20 includes the amplifier 50 and the filter 52, disclosed above, the focus sensor 80, and the signal combiner 126, the latter being coupled to the filter 52 via the switch 54 and terminals J, K and E. The feedback loop is completed by operating the switch 54 to connect terminals J and K. The feedback loop is disabled by operating the switch 54 to disconnect terminals J and K. During operation of the feedback loop, an energization of the coils 48 to advance the objective lens 20 towards the drum 12 by an excessive amount results in the generation of an error signal at terminal E which activates the coils 48 to retract the objective lens 20. Similarly, upon an excessive retraction of the objective lens 20 from the drum 12, the loop produces an error signal at terminal E which acts to energize the coils 48 to advance the lens 20 towards the drum 12. The error signal at terminal E has zero or near zero amplitude when the lens 20 is properly focused upon the sheet 22. The feedback loop of the coils 48 with the focus sensor 80 is operative during a scanning of the sheet 22 by the print head 16 during those portions of a scan in which the clamp 30 is distant from the objective lens 20. However, upon an approach of the clamp 30 to the lens 20, the feedback loop is disabled by operation of the switch 54, and remains disabled until the clamp 30 has cleared the lens 20. Operation of the switch 54 is accomplished by a signal of the computer 130, the switch control signal being coupled from the computer 130 via the interface 128 to the switch 54. The foregoing feedback loop including the coils 48 and the focus sensor 80 may be referred to as the focus loop.

A further feedback loop, which may be referred to as the position loop serves to position the objective lens 20 at a parking location during disablement of the focus loop, such as occurs during passage of the clamp 30 by the lens 20. The position loop is enabled by operation of the switch 54 to connect terminals J and R, the latter being connected via the bypass circuit 122 to terminal P. The position loop includes the photodetectors 66 and the signal combiner 76 which are serially connected via the bypass circuit 122, the switch 54 and the amplifier 50 to the coils 48. Displacement of the objective lens 20 from the reference position produces an error signal at the output of the difference amplifier 234 which activates the coils 48 to drive the lens 20 back towards the reference position. The reference position is at a specific distance of the lens 20 from a front wall 162 of the housing 58. The reference position is a suitable location from which enablement of the focus loop can be initiated upon resumption of scanning after passage of the clamp 30 past the lens 20.

During the production of an image upon the photosensitive sheet 22, data is provided to the LDs 90 of the radiation source 18 from a data source 164, the data source 164 outputting electric signals which activate a drive circuit 166 to drive individual laser diodes of the array of diodes 90. The selection of specific ones of the diodes 90 to be activated will be described in further detail with reference to FIG. 3 to produce gray-scale printing of pixels of the image on the sheet 22. Synchronization of the rate of data flow from the source 164 to the radiation source 18 with the speed of rotation of the drum 12 is accomplished by connection of the computer 130 to the data source 164. Connection of the computer 130 to the source 164 is accomplished via terminal D.

Figure 2:
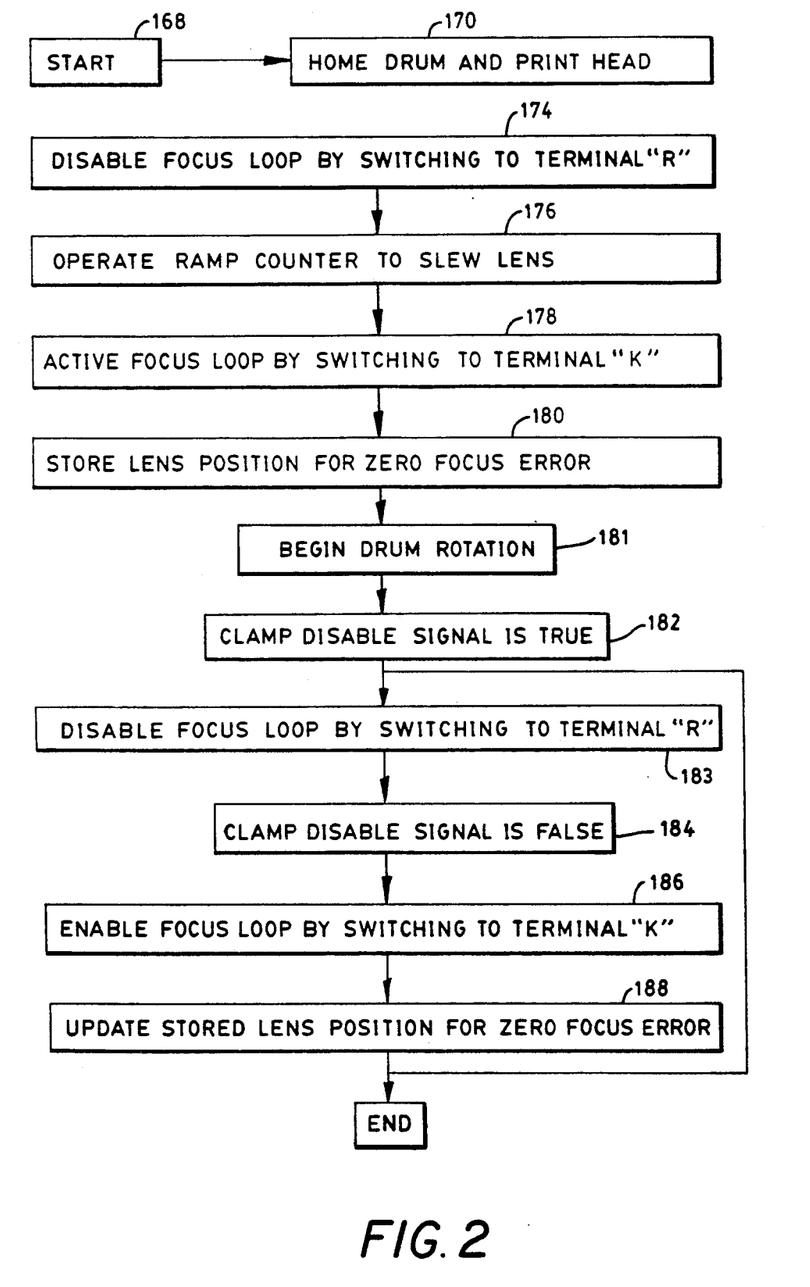
FIG. 2 is a flow chart showing operation of the system, including a computer thereof, during the printing of an image on a sheet of print medium carried by a rotating drum of FIG. 1.

FIG. 2 is a flow chart showing operation of the computer 130 in directing a scanning of the drum 12 by the print head 16 to accomplish a printing of an image upon the photosensitive sheet 22 of FIG. 1. Included within the flow chart are references to the operations of the focus loop and the position loop, as well as enablement of data flow from the source 164 to the radiation source 18 during the printing of an image on the sheet 22.

With reference to the flow chart, the procedure begins with a start at block 168 and proceeds to block 170 for rotation of the drum 12 to home position. Home position is immediately after the trailing edge of the clamp 30 where the sheet 22 is again visible to the objective lens 20. Thereupon, at block 174, the computer 130 disables the focus loop by operating the switch 54 connecting terminal J to terminal R. Operation proceeds to block 176 to activate a ramp generator in the bypass circuit 122, as will be described hereinafter, for energizing the coils 48 with a ramp signal to slew the lens 20 relative to the carriage 40. During the slewing process, the focus error signal at terminal E of the signal combiner 126 is observed to determine the lens position at which focus of the sheet 22 is obtained.

The lens position of zero focus error is stored at block 180. The drum then begins its rotation at block 181. A clamp disable signal is used to tell the focusing system when to disable the focusing servo. This signal is derived from the drum shaft angle encoder. The clamp disable signal is true for an angular segment beginning just prior to the leading edge of the clamp and ending just after the trailing edge of the clamp. At 182, the clamp disable signal thus will become true just prior to the leading edge of the clamp appearing in front of the focusing device. At 183, the focus loop is disabled by switching to terminal R. After the trailing edge of the clamp passes the focus head, the clamp disable signal becomes false at 184. At block 186, the focus loop is enabled by switching to terminal K. Immediately after enabling the focus loop, the lens position for zero focus error is sampled and stored at block 188. We then wait for block 182 to occur and then repeat blocks 183 to 188 until the drum stops spinning at the end of the print.

During the preceding, the writing lasers are activated when the sheet is present in front of the focusing device after the drum has reached its correct rotational speed.

Figure 3:
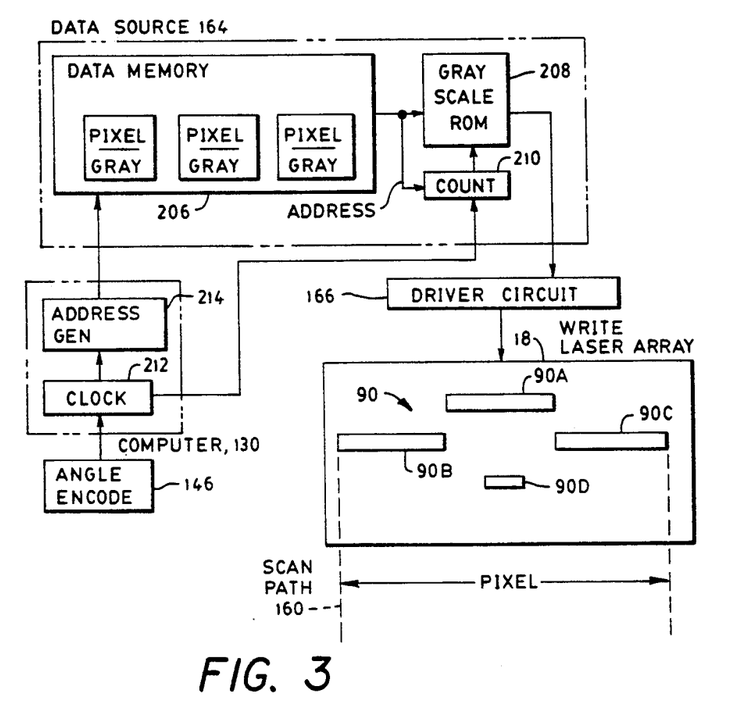
FIG. 3 is a block diagram of a data source, operatively coupled to a write laser array of FIG. 1, for producing gray-scale pixels in a printed image.

FIG. 3 shows an implementation of the data source 164 for providing individual pixels of the image imprinted upon the photosensitive sheet 22. They may be black, white, or a blend of black and white areas which give the visual impression of a gray scale. This is accomplished in the following manner. The data source 164 comprises a data memory 206, a gray-scale memory 208 and a counter 210 for addressing the gray-scale memory 208. The gray-scale memory 208 may be constructed as a read-only memory (ROM). Output signals of the gray-scale memory 208 serve as output signals of the data source 164, and are applied via the drive circuit 166 to the radiation source 18 (shown in both FIGS. 1 and 3) for activating the LDs 90. Also shown in FIG. 3 is a portion of the computer 130, namely a clock 212 and an address generator 214. Connections of the computer 130 to the angle encoder 146 and to the data source 164 are accomplished via the interface 128, as shown in FIG. 1. The interface 128 is deleted in FIG. 3 to simplify the drawing. The embodiment of the gray-scale feature, as depicted in FIG. 3, is presented by way of example, it being understood that the principles of the invention can be practiced with other implementations of the gray-scale feature.

In operation, the data memory 206 stores data of each pixel, and the location of each pixel, of the image to be imprinted on the photosensitive sheet 22. The location in the image is designated by the address of storage of each pixel within the data memory 206. In the case of a printing system employing only white or black pixels, the pixel data consists of a single bit indicating whether a pixel is to be white or black. However, in the case of gray-scale presentation of the pixels, the data stored in the data memory for each pixel comprises a multiple-digit word designating the level of gray scale to be applied in the imprinting of each pixel. With respect to the array of LDs 90 in the radiation source 18, in a preferred embodiment of the invention, the LDs 90 are arranged as a group of linear subarrays of LDs. This is depicted diagrammatically in FIG. 3. In the diagrammatic representation of FIG. 3, the source 18 is represented as a pixel lying within the spiral scan path 160 upon the drum 12, the path 160 having been presented previously in FIG. 1. The array of diodes 90 includes a linear subarray 90A of individual diodes, the subarray measuring, by way of example, 3 microns in width by 90 microns in length. The subarray 90A extends one third of a pixel width, this being one third of the width of the scan path 160, and is centered within the scan path 160. Two additional diode subarrays 90B and 90C are provided, the subarrays 90B and 90C being identical to the subarray 90A, but being spaced to the right and to the left sides of the subarray 90A as shown in the diagrammatic view of FIG. 3. Illumination of all of the light-emitting diodes, or laser diodes, of the three subarrays 90A, 90B and 90C would produce a continuous swath upon the photosensitive sheet 22 during a generation of the spiral scan path 160. Illumination of only the center subarray 90A would produce a stripe along the center of the path 160, while illumination of either of the side subarrays 90B or 90C would produce a black stripe on the right or on the left side, respectively, of the scan path 160 in the sheet 22.

Also included in the array of LEDs 90 is a relatively short subarray 90D measuring 5 microns in length by 3 microns in width. The subarray 90D is centered along a center line of the scan path 160. A flashing on and off of any of the subarrays 90A–D produces a marking within a region of the scan path, the extent of the marking depending upon the duration of a flash of radiation produced by the activated ones of the LEDs 90. For example, by flashing the subarrays 90A and 90B on and off several times during the scanning of a length of the path 160 equal to the extent of a single pixel, there is imprinted a pixel having a checkerboard appearance (viewed under a microscope). However, when viewed by the human eye, the appearance is a uniform gray. By selecting the intervals of time during which selected ones of the diodes 90 are to be illuminated, various patterns of black and white can be imprinted within each pixel of the image. This gives numerous values of gray scale.

In the operation of the data source 164, for each pixel, the data memory 206 outputs an address identifying the level of gray scale desired, the level ranging from pure white to pure black. The gray-scale address is applied to the gray-scale memory 208, which, in response to the address, outputs a digital word to the driver circuit 166 directing activation of specific ones of the subarrays 90A–D. In addition, the presence of the address signal resets the counter 210 to count clock pulses of the clock 212. The count provided by the counter 210 serves as an additional sequence of partial addresses to output from the gray-scale memory 208 signals which direct a pulsing or flashing of light from selected ones of the subarrays 90A–D for a succession of intervals within the time allocated for the scanning of a single pixel. Thereby, the radiation source 18 is able to output a checkerboard format, or other arrangement of light and dark areas wherein the average amount of darkness apparent across the surface of a pixel is selectable to produce the numerous levels of gray scale. Also shown in FIG. 3 is an outputting of angle data from the encoder 146 to synchronize the clock 212 with rotation of the drum 12 to ensure that the rate of presentation of data is locked to the rotation of the drum 12.

In order to accurately produce the gray scale upon the print medium, and to produce well defined pixels upon the print medium, it is important to maintain uniformity of illumination in the write beam. The use of the telecentric optics in the optical system 82 (FIG. 1), provides for the imaging of a near field region spaced apart from the diode array and located in front of the diode array. This region is characterized by contributions of light from the various diodes and has substantial uniformity of illumination. The telecentric optics preserves this uniformity of illumination and projects the uniform illumination upon the print medium to attain the desired accuracy in presentation of the gray scale, as well, well defined pixels, in printing of an image of a desired subject.

Figure 4:
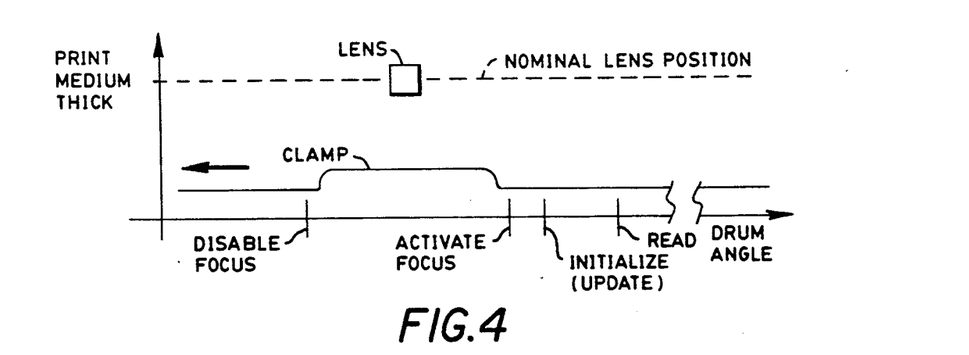
FIG. 4 is a graph showing a sequence of events in the positioning of an objective lens of the system of FIG. 1 as a function of drum position.

FIG. 4 is a graph showing thickness of the sheet 22 as a function of angular position around the drum 12, shown on the horizontal axis of the graph. The sheet presents a uniform depth except at the location of the clamp 30 where the clamp 30 presents a protuberance in the otherwise smooth surface. Also, the graph shows the location of the lens 20 which is essentially constant relative to the drum surface, except for minor variations too small to show in the figure. The nominal value of the lens position is maintained by the focus loop wherever the print medium is in view. At the location of the clamp 30, the lens position is maintained by disabling the focus loop, and by retaining the lens in its parking position, until the print medium again becomes visible to the focus loop sensor 80. The shaft angle encoder 146 outputs drum position, as has been described hereinabove, to enable the various steps in the activation of the focus loop and in the updating of stored parking position and reading out the value of the parking position from storage. Thus, the horizontal axis shows various points at which steps are taken, namely, reading from storage of a previously stored value of lens parking position before the appearance of the clamp 30, disabling the focus loop and retaining the lens at the read-out parking position immediately before and during passage of the clamp 30, reactivating the focus loop and then initiating or updating the parking position.

Figures 5, 6:
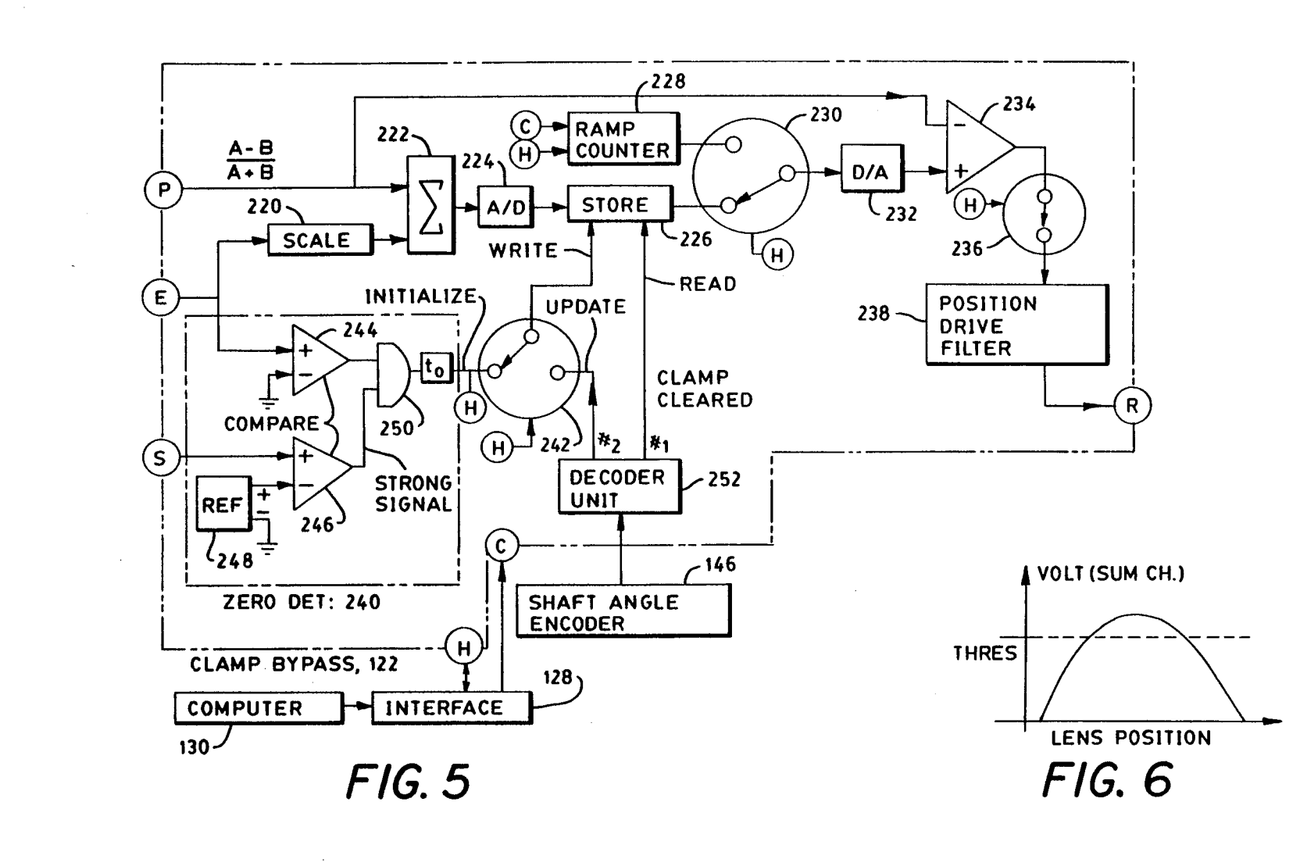
FIG. 5 is a block diagram of a clamp bypass circuit of FIG. 1.
FIG. 6 shows variation in detected light intensity as function of position of the objective lens.

FIG. 5 shows details in the construction of the clamp bypass circuit 122. the bypass circuit 122 comprises a scaler 220, a summer 222, an analog-to-digital converter 224, a storage unit 226, a ramp counter 228, a switch 230, a digital-to-analog converter 232, a differential amplifier 234, a switch 236 and filter 238. In operation, the bypass circuit 122 is operative in the lens position feedback loop for positioning the lens 20 (FIG. 1) at a suitable parking position during passage of the clamp 30 by the lens 20. The parking position is established initially in an initialization procedure in which the lens 20 is slewed through the carriage 40 to find a position at which the focus error signal at terminal E is zero. This is accomplished with the drum 12 held stationary at a home position located immediately after passage of the clamp 30 by the lens 20, the home position corresponding to the closest region at the top edge of the sheet 22 at which printing can commence. Thereafter, with each rotation of the drum 12 through the home position, the parking position is updated to correspond to any undulations which may appear in the sheet 22 as the print head translates along the drum 12. By proper selection of the parking position, the lens 20 is located optimally for resumption of the printing process after passage of the clamp 30 by the lens 20.

Initialization and updating of the lens parking position is accomplished as follows with the aid of the focus error signal provided at terminal E of the signal combiner 126 (FIG. 1), the position error signal provided at terminal P of the signal combiner 76 (FIG. 1), the sum channel signal provided at terminal S of the signal combiner 126, and via connections with the computer 130 indicated by terminal H. During initialization, the computer 130 directs the drum 12 to the home position which is indicated by the angle encoder 146. Thereupon, via terminal H, the computer 130 operates the switch 230 to connect the counter 228 to the converter 232, resets the counter 228, and activates the counter 228 to count clock pulses provided by the computer 130 at terminal C. The resulting output count of the counter 228 is a digital ramp (staircase waveform) which is converted by the converter 232 to an analog ramp voltage fed to a positive input terminal of the differential amplifier 234. The position signal is applied from terminal P to the negative input terminal of the differential amplifier 234. The position signal is in the form of a ramp voltage which increases with translation of the lens 20 in the carriage 40. Therefore, the position signal also serves to identify the position of the lens 20 within the carriage 40. The output signal of the amplifier 234 is the difference between the commanded ramp position and the actual position of the lens 20 relative to the carriage 40.

The clamp bypass circuit 122 further comprises a detector 240 responsive to signals at the terminals E and S for noting the presence of a zero focus error which occurs during the slewing movement of the lens 20. The sheet 22 is correctly focussed by the lens 20 upon an outputting of a zero error signal by the signal combiner 126. the position error signal (terminal P) and the focus error signal (terminal E) are summed together by the summer 222 and converted to a digital sum signal by the converter 224. It is noted that the focus error signal is also a ramp voltage, similar to the position error signal, However, the slope of the ramp of the focus error signal, in the preferred embodiment of the invention, has been found to be greater than the slope of the ramp of the position error signal by a factor of 5. Before summing together the focus and the position error signals, it is desirable to equalize the two slopes. This is accomplished at the scaler 220 which scales the amplitude of the focus error signal by a factor of one fifth. Thereby, the digital sum signal outputted by the converter 224 is influenced equally by the focus and the position error signals.

Upon the occurrence of the zero focus error, the detector 240 outputs a logic-1 signal and the focusing servo is enabled. After a delay for settling, the storage unit 226 to store the sum signal. The logic-1 signal outputted by the detector 240 is also applied via terminal H and the interface 128 to the computer 130 to signal the end of the initialization process. The computer then activates the drum 12 to rotate.

The zero detector 240 comprises two comparators 244 and 246, a source 248 of positive reference voltage, and an AND gate 250. The comparator 244 is operative to compare the focus error signal amplitude with zero volts provided by a connection of ground to the negative input terminal of the comparator 244. The focus error signal is applied to the positive input terminal of the comparator 244. During the initial stage of the slewing of the lens 20, the focus error signal is negative, and the signal outputted by the comparator 244 is relatively low, a logic-0. The signal outputted by the comparator 244 goes high to a logic-1 as the focus error signal reaches zero.

The voltages outputted by the photodetectors 94 (FIG. 1) vary in amplitude with lens position as is shown in the graph of FIG. 6. The maximum signal strength is obtained with the sheet 22 in correct focus by the lens 20. In order to prevent an occurrence of a false zero detection, which might during a lens position of low light upon the photodetectors 94, the sum of the two output signals of the photodetectors 94 (at terminal S) is applied to the comparator 246 to check for the presence of adequate signal strength. The sum-channel signal at terminal S is applied to the positive input terminal of the comparator 246, and the positive reference voltage of the source 248 is applied to the negative input terminal of the comparator 246. the reference voltage of the source 248 serves as the threshold shown in FIG. 6. The output signal of the comparator 246 goes high (logic-1) for values of sum-channel signal above the threshold, and serves to activate the AND gate to pass the output signal of the comparator 244 to the switch 242.

Also included in the bypass circuit 122 is a decoder unit 252 having a plurality of decoders for decoding the signal outputted by the shaft angle encoder 146. The first decoder output is a signal designating the attainment of a drum position immediately after passage of the clamp 30 at which time the value of stored lens reference position is to be read out of the storage unit 226 for updating the lens parking position. The read command, in terms of drum angle, is shown in the graph of FIG. 4. The second of the decoders of the decoder unit 252 provides the initialize or update signal, shown in FIG. 4, which indicates that the drum position is appropriate for initializing the lens parking reference position, as has been described above, or for updating the lens parking reference position as is described below.

After initialization of the lens position, the drum 12 proceeds to rotate and the print head 16 translates along the drum 12, as has been described above. With each rotation of the drum 12, upon passage of the clamp 30 by the lens 20, the lens 20 is placed in the parking position. This occurs upon disabling of the focus control loop, immediately prior to the passage of the clamp 30, as indicated in FIG. 4. It is desirably to update the lens parking reference position with each rotation of the drum 12, as noted above, to compensate for any undulations which may appear in the sheet 22 as the print head translates along the drum 12.

The updating of the lens parking position is accomplished by operating the switch 242 to connect the second output of the decoder unit 252 to the storage unit 226. Also, the switch 230 is operated to connect the output terminal of the storage unit 226 to the converter 232. Upon occurrence of the update command signal from the decoder unit 252, the storage unit 226 stores the present value of the sum signal outputted by the converter 224. No slewing of the lens 20 is necessary during update because the lens 20 is already at, or close to, the optimum parking position. With each rotation of the drum 12, the latest value of the lens parking position is read from the storage unit 226 prior to passage of the clamp 30, the latest value of the parking position then being used during disablement of the focus loop to position the lens 20 until after passage of the clamp 30, whereupon the focus loop is reactivated.

For best accuracy in positioning the lens 20 it is desirable to employ different filters for controlling dynamics of the position control loop and the focus control loop. The focus drive filter 52 (FIG. 1) is employed in the focus control loop, and the position drive filter 238 (FIG. 5) is employed in the position control loop. During a period of inactivity of the focus drive filter 52, the filter is completely disconnected from other circuitry by the switch 124 at the input to the filter 52 and by the switch 54 at the output of the filter 52. During a period of inactivity of the position drive filter 238, the filter is completely disconnected from other circuitry by the switch 236 at the input to the filter 238 and by the switch 54 at the output of the filter 52. This allows various voltages which may be present in the filters, such as the voltage of a charged capacitor, to drain off. This avoids the possibility of a large transient behavior taking place upon a switching of the filters. It is understood that each of the filters may comprise suitable frequency control circuitry for loop stability, such as a lead-lag circuit or an integrator, and may also comprise amplifiers to provide adequate gain as is well known in feedback design. Each of the foregoing switches is operated under command of the computer 130.

Figure 7:
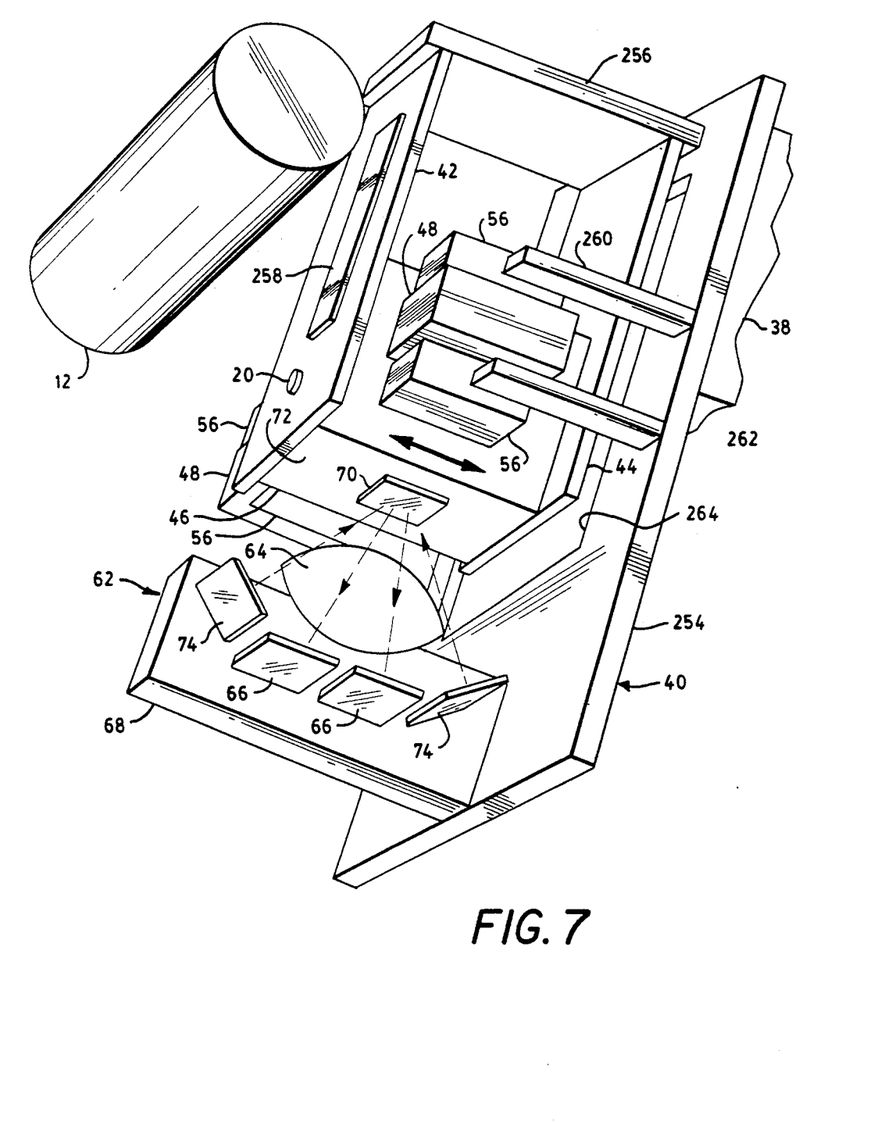
FIG. 7 is a stylized perspective view of a lens-supporting carriage including a showing of a position sensing optical system located beneath the carriage.

FIG. 7 presents the underside of the carriage 40 (FIG. 1) in a stylized perspective view to show the locations of the various components of the carriage 40 used in positioning the lens 20, such as the frame 46, the coils 48 and the photodetectors 66 which were presented by way of exploded diagrammatic view in FIG. 1. In FIG. 7 the carriage 40 includes a back plate extending in a vertical plane from the housing 38, the plate 254 extending in a plane parallel to the axis of the drum 12. The extension 68 protrudes from a lower portion of the plate 254 for supporting the photodetector 66 and the lamps 74 in their respective positions about the lens 64. The legs 42 and 44 extend downwardly from an arm 256 which protrudes forwardly from a top cushion of the plate 254. The legs 42 and 44 are resilient and pivot forwardly and backwardly about their respective junctions with the arm 256 so as to allow translation of the frame 46 in a direction perpendicular to the axis of the drum 12. The frame 46 is secured to lower portions of the legs 42 and 44 which carry the frame 46. The strip 258 of damping material is secured to the front leg 42 for damping movement thereof, and a similar strip (not shown) is secured to the rear leg 44.

Struts 260 and 262 protrude forward from the back plate 254 to support the magnets 56 on one side of the carriage 40, there being a similar set of struts (not shown) for supporting the magnets 56 on the opposite side of the carriage 40. An opening 264 in the back plate 254 provides space for translation of the frame 46 and passage for the beam of laser radiation which propagates through the lens 20. The location of the target 70 upon the bottom 72 of the frame 46 permits illumination of the target 70 by the lamps 74 and a viewing of the target 70 by the photodetectors 66 during translation of the target 70 past the lens 64.

In view of the foregoing description, the printing system 10 of the invention is able to accurately print an image of a subject upon a discontinuous recording medium such as a sheet of photosensitive material. Data of the subject is presumed to have been previously stored in a memory, such as memory of the data source 164. If desired, the data can be provided by an optical scanner of a subject being imaged, which data would be digitized and stored temporarily in the data source 164 which would serve then as a buffer storage. The feature of retracting the print head from the print drum allows the convenient use of a clamp carried by the drum for securing ends of the discontinuous medium to the drum during the implementation of a spiral scanning of the print medium. Furthermore, the use of the optical focusing apparatus provides for an accurate focusing of a write beam upon the photosensitive sheet, the focusing compensating rapidly for any undulations which may be present in the surface of the print medium.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A printer operative with a sheet of photosensitive recording material comprising:

a cylindrical print drum rotatable about a cylindrical axis;

a clamp for securing said sheet of photosensitive recording material about a cylindrical surface of the drum;

a print head including a first radiation source providing a first radiation with a first set of radiation characteristics of frequency and intensity for imprinting marks on said sheet, said print head having a housing and an objective lens carried by the housing for focusing said first radiation upon said sheet;

a second radiation source providing a second radiation with a second set of radiation characteristics of frequency and intensity for illuminating said sheet without imprinting marks thereon;

sensing means responsive to said second radiation for sensing an amount of spacing between said objective lens and said sheet, said sensing means outputting a signal indicating said amount of spacing between said objective lens and said sheet;

optical means for guiding said first and said second radiations respectively from said first and said second sources through said objective lens to said sheet, at least a portion of said second radiation being reflected back from said sheet into said objective lens, said optical means including means for directing reflected second radiation from said objective lens to said sensing means;

positioning means for adjusting a position of said objective lens and a position of said print head relative to said sheet and relative to said clamp during rotation of said drum; and wherein said positioning means includes motion means responsive to said signal of said sensing means for moving said objective lens relative to said housing, and servo means for moving said housing relative to said drum to provide a scanning of said sheet of photosensitive material upon rotation of said drum; and said servo means includes a memory and address means responsive to a position of said clamp for addressing said memory, said memory storing clamp clearance data, said servo means being operative in response to said clamp clearance data for disabling said motion means and for retracting said housing during a passage of said clamp past said print head.

2. A printer according to claim 1 further comprising detecting means responsive to said second radiation for detecting a location of said objective lens within said housing, said detecting means outputting a signal indicating the location of said objective lens within said housing; and wherein said positioning means is operative in response to said signal of said detecting means for locating said objective lens at a reference location in said housing during said disabling of said motion means.

3. A printer according to claim 1 wherein said address means includes a shaft angle encoder for measuring an angle of orientation of said drum about said cylindrical axis, said clamp rotating about said axis with said drum.

4. A printer according to claim 1 wherein said sensing means includes an array of photodetectors and an optical knife edge disposed in a path of propagation of said second radiation for producing signal of said sensing means.

5. A printer according to claim 1 wherein said second radiation source and said optical means are located within said print head.

6. A printer according to claim 5 wherein said optical means includes an array of coated dichroic prisms for combining a path of propagation of said first radiation from said first source and a path of propagation of said second radiation from said second source into a first common path for both said first and said second radiations, said first common path extending to said objective lens;

a quarter-wave plate disposed on said first common path, said first and said second radiations differing in frequency and having parallel linear polarization from each other upon entry into said optical means from said first and said second sources;

a color filter responsive to a difference in frequency between said first and said second radiations, said quarter-wave plate rotating the directions of polarization of radiation reflected from said sheet back into said optical means to enable the reflected radiations to exit said array of prisms along a second common path directed through said filter toward said sensing means, said filter blocking said first radiation from propagating to said sensing means.

7. A printer according to claim 6 wherein said sensing means includes an array of photodetectors and an optical knife edge disposed in a path of propagation of said second radiation for producing signal of said sensing means.

8. A printer according to claim 7 further comprising detecting means responsive to said second radiation for detecting a location of said objective lens within said housing, said detecting means outputting a signal indicating the location of said objective lens within said housing; and wherein said positioning means is operative in response to said signal of said detecting means for positioning said objective lens at a reference position in said housing during said disabling of said motion means.

9. A printer operative with a sheet of photosensitive recording material comprising:

a cylindrical print drum rotatable about a cylindrical axis;

a clamp for securing said sheet of photosensitive recording material about a cylindrical surface of the drum;

a print head including a first radiation source providing a first radiation with a first set of radiation characteristics of frequency and intensity for imprinting marks on said sheet, said print head having a housing and an objective lens carried by the housing for focusing said first radiation upon said sheet;

a second radiation source providing a second radiation with a second set of radiation characteristics of frequency and intensity for illuminating said sheet without imprinting marks thereon;

sensing means responsive to said second radiation for sensing an amount of spacing between said objective lens and said sheet, said sensing means outputting a signal indicating said amount of spacing between said objective lens and said sheet;

optical means for guiding said first and said second radiations respectively from said first and said second sources through said objective lens to said sheet, at least a portion of said second radiation being reflected back from said sheet into said objective lens, said optical means including means for directing reflected second radiation from said objective lens to said sensing means;

positioning means for adjusting a position of said objective lens relative to said sheet, and relative to said clamp during rotation of said drum; and wherein said positioning means is responsive to said signal of said sensing means for moving said objective lens relative to said housing;

said optical means includes an array of coated dichroic prisms for combining a path of propagation of said first radiation from said first source and a path of propagation of said second radiation from said second source into a first common path for both said first and said second radiations, said first common path extending to said objective lens;

a quarter-wave plate disposed on said first common path, said first and said second radiations differing in frequency and having parallel linear polarization from each other upon entry into said optical means from said first and said second sources;

a color filter responsive to a difference in frequency between said first and said second radiations, said quarter-wave plate rotating the directions of polarization of radiation reflected from said sheet back into said optical means to enable the reflected radiations to exit said array of prisms along a second common path directed through said filter toward said sensing means, said filter blocking said first radiation from propagating to said sensing means.

10. A printer according to claim 9 wherein said sensing means includes an array of photodetectors and an optical knife edge disposed in a path of propagation of said second radiation for producing a signal of said sensing means.

11. A printer operative with a sheet of photosensitive recording material comprising:

a cylindrical print drum rotatable about a cylindrical axis;

a clamp for securing said sheet of photosensitive recording material about a cylindrical surface of the drum;

a print head including a first radiation source providing a first radiation with a first set of radiation characteristics of frequency and intensity for imprinting marks on said sheet, said print head having a housing and an objective lens carried by the housing for focusing said first radiation upon said sheet;

a second radiation source providing a second radiation with a second set of radiation characteristics of frequency and intensity for illuminating said sheet without imprinting marks thereon;

sensing means responsive to said second radiation for sensing an amount of spacing between said objective lens and said sheet, said sensing means outputting a signal indicating said amount of spacing between said objective lens and said sheet;

optical means for guiding said first and said second radiations respectively from said first and said second sources through said objective lens to said sheet, at least a portion of said second radiation being reflected back from said sheet into said objective lens, said optical means including means for directing reflected second radiation from said objective lens to said sensing means;

positioning means for adjusting a position of said objective lens and a position of said print head relative to said sheet and relative to said clamp during rotation of said drum; and wherein said positioning means includes motion means responsive to said signal of said sensing means for moving said objective lens relative to said housing, and servo means for moving said housing relative to said drum to provide a scanning of said photosensitive material upon rotation of said drum; and said positioning means includes means for storing a reference position of said objective lens, said positioning means being operative to locate said objective lens at said reference position during a passage of said clamp past said print head.

12. A printer according to claim 11 wherein said positioning means is operative subsequent to a passage of said clamp to update said reference position for use during a subsequent passage of said clamp past said print head.

13. A printer according to claim 12 wherein said sensing means includes an array of photodetectors and an optical knife edge disposed in a path of propagation of said second radiation for producing signal of said sensing means.

14. A printer according to claim 13 wherein said optical means includes an array of coated dichroic prisms for combining a path of propagation of said first radiation from said first source and a path of propagation of said second radiation from said second source into a first common path for both said first and said second radiations, said first common path extending to said objective lens;

a quarter-wave plate disposed on said first common path, said first and said second radiations differing in frequency and having parallel linear polarization from each other upon entry into said optical means from said first and said second sources;

a color filter responsive to a difference in frequency between said first and said second radiations, said quarter-wave plate rotating the directions of polarization of radiation reflected from said sheet back into said optical means to enable the reflected radiations to exit said array of prisms along a second common path directed through said filter toward said sensing means, said filter blocking said first radiation from propagating to said sensing means.

15. A method for operating a printer having a discontinuous photosensitive sheet of recording material supported by a rotatable cylindrical drum, the method comprising steps of:

clamping ends of said sheet to said drum for securing said sheet to said drum;

rotating said drum about a cylindrical axis;

scanning a print head linearly along said drum in a direction parallel to said axis, said print head including a first radiation source providing a first radiation with a first set of radiation characteristics of frequency and intensity for imprinting marks on said sheet, said print head having a housing and an objective lens carried by the housing for focusing said first radiation upon said sheet;

directing a second radiation from a second radiation source through said housing and through said objective lens to impinge upon said sheet, said second radiation having characteristics of frequency and intensity for illuminating said sheet without imprinting marks thereon;

sensing a part of said second radiation reflected back from said sheet for measuring an amount of spacing between said objective lens and said sheet;

in response to said measuring of said spacing between said objective lens and said sheet, positioning said objective lens relative to said sheet and relative to said clamp during rotation of said drum; and wherein said positioning includes a moving of said lens relative to said housing.

16. A method according to claim 15 further comprising a step of storing the value of a reference position of said objective lens relative to a spacing between said print head and said drum; and locating said objective lens at said reference position during passage of said clamp past said objective lens during rotation of said drum.

17. A method according to claim 16 further comprising a step of initializing said reference position during a stationary attitude of said drum by varying a spacing between said objective lens and said drum to establish a position of focus of said sheet, said initializing further comprising a storing said position of focus to serve as said reference position.

18. A method according to claim 17 further comprising a step of updating said reference value upon each passage of said clamp past said objective lens during rotation of said drum.

19. A method according to claim 18 wherein said updating includes a measuring of focal distance of said objective lens simultaneously from said sheet by a plurality of optical systems, and combining measurements by said plurality of optical systems to provide said reference position.

* * * * *